United States Patent [19]

Ferrary

[11] 4,243,450
[45] Jan. 6, 1981

[54] METHOD OF MANUFACTURING TUBELESS TIRES FOR BICYCLES AND MOTORCYCLES

[75] Inventor: Jean-Paul Ferrary, Paris, France
[73] Assignee: Wolber, Soissons, France
[21] Appl. No.: 964,444
[22] Filed: Nov. 28, 1978

[30] Foreign Application Priority Data

Mar. 28, 1978 [FR] France .................. 78 08859

[51] Int. Cl.³ .................. B29H 17/22; B60C 5/02
[52] U.S. Cl. .................. 156/123 R; 152/350; 152/354 R; 152/364; 156/132
[58] Field of Search .............. 156/110 R, 118, 123 R, 156/131–133, 121; 152/330 R, 349, 350, 354 R, 374, 363, 364

[56] References Cited

U.S. PATENT DOCUMENTS

| 1,875,390 | 9/1932 | Musselman | 156/118 |
| 1,913,422 | 6/1933 | Wikle | 156/121 |
| 2,015,459 | 9/1935 | Musselman | 152/354 |
| 4,023,608 | 5/1977 | Meiss | 152/362 R |
| 4,057,445 | 11/1977 | Brinkley | 152/354 R |

Primary Examiner—John E. Kittle
Attorney, Agent, or Firm—Wenderoth, Lind & Ponack

[57] ABSTRACT

A method of manufacturing tubular tires for bicycles and motorcycles, includes the steps of:
  laying bead steel wires longitudinally on a first or inner sheet of a tire casing and adjacent the edges thereof;
  folding the longitudinal marginal portions of the first or inner sheet of the casing around the bead wires in order to cover the wires completely;
  laying a second or intermediate sheet on top of the first or inner sheet, the longitudinal edges of the second sheet projecting well beyond the in-turned longitudinal edges of the first sheet;
  laying a casing tread on the thus superposed sheets;
  shaping the tire assembly thus obtained by imparting a horseshoe configuration thereto, as seen in cross-section;
  introducing an uncured inner air tube into the casing;
  closing the tire by assembling by welding the side edges of the second or intermediate sheet projecting from the casing; and
  vulcanizing the assembly.

2 Claims, 9 Drawing Figures

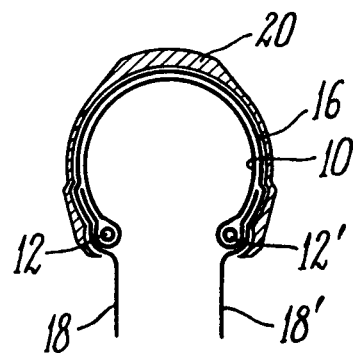
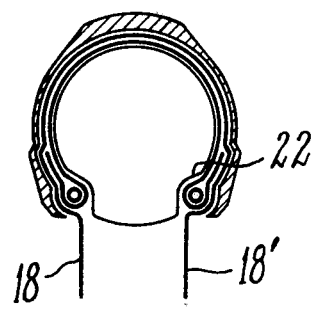
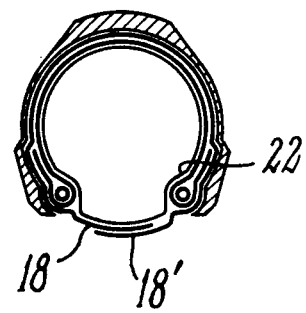
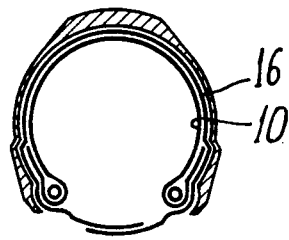

METHOD OF MANUFACTURING TUBELESS TIRES FOR BICYCLES AND MOTORCYCLES

BACKGROUND OF THE INVENTION

The present invention relates to the manufacture of tubular tires for cycles and motorcycles. It is based on the teachings contained in the U.S. Patent Application Ser. No. 935,316, filed on Aug. 21, 1978, and assigned to the assignee of the present invention which relates likewise to the manufacture of so-called tubular tires.

This prior patent application discloses a method of manufacturing tubular tires for two-wheel vehicles and the like. This method comprises the steps of enclosing an uncured inner tube in a conventional casing, before the vulcanization operation, and assembling the edges of the casing by heat welding, the inner portion of one edge overlapping the outer portion of the other, whereafter the vulcanization proper is carried out. According to a modified version of this method the uncured inner air tube is replaced by coating the inner walls of the casing with a layer of a highly impervious mixture of which the base consists of natural or synthetic rubber.

SUMMARY OF THE INVENTION

It is the primary object of the present invention to apply this former method to the manufacture of tubular tires by providing the means necessary for incorporating bead wires in tires of this type in order to enable the tire to be properly bound on conventional drop-center rims for bicycles and motorcycles.

Consequently, this invention provides a method characterized in that it comprises the following sequence of steps:

(i) laying bead steel wires longitudinally on a first or inner sheet of the tire casing and adjacent the edges thereof;

(ii) folding the longitudinal marginal portions of this first or inner sheet of the casing around the bead wires in order to cover them completely;

(iii) laying a second or intermediate sheet on top of the first or inner sheet, the longitudinal edges of this second sheet projecting well beyond the inturned longitudinal edges of the first sheet;

(iv) laying a casing tread on the thus superposed sheets;

(v) shaping the tire assembly thus obtained by imparting a horseshoe configuration thereto;

(vi) introducing an uncured inner air tube into the casing;

(vii) closing the tire by assembling by welding the side edges of the second or intermediate sheet projecting from the casing, and (viii) vulcanizing the assembly.

According to a modified version of this method, the second or intermediate sheet of the casing is coated with a layer of highly impervious material, as contemplated in the above-mentioned prior Patent Application, this layer acting as a substitute for the uncured inner tube, and in this modified version the tire is closed, as mentioned hereinabove, immediately after laying the tread, and the vulcanization is carried out after this closing operation.

BRIEF DESCRIPTION OF THE DRAWING

Reference will now be made to the accompanying drawings illustrating diagrammatically two typical embodiments of the method of this invention. In the drawings:

FIGS. 1 to 8 are vertical cross-sections illustrating the successive steps of the manufacturing method of this invention.

FIG. 9 is a vertical cross-section showing a tubeless tire obtained by applying the method of this invention.

DETAILED DESCRIPTION OF THE INVENTION

Referring first to FIGS. 1 to 8 of the drawings, the method of the present invention consists in laying the first sheet 10 on a drum, whereafter (FIG. 2) steel bead wires 12 and 12' are laid (FIG. 2) along its longitudinal edges. Then, the marginal portions 14, 14' of the first sheet 10 are folded (FIG. 3) on themselves around the bead wires 12, 12' so as to enclose these wires completely, as clearly shown in FIG. 3.

Figure 1:
Figure 2:
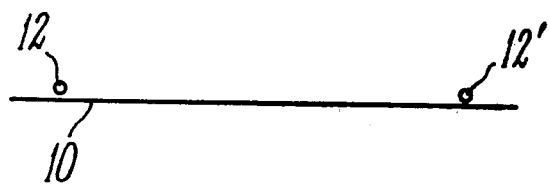
Figure 3:
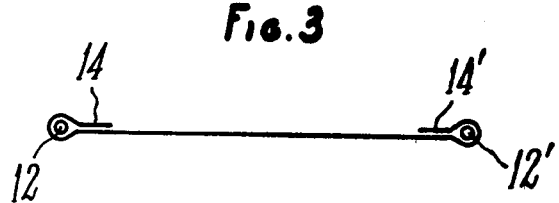
Figure 4:
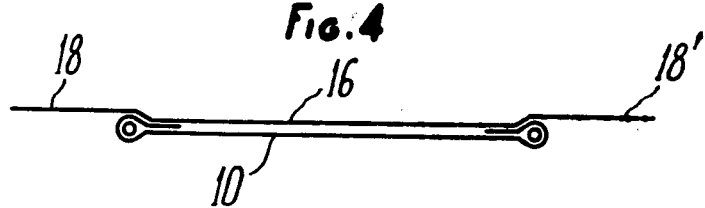

The next step (FIG. 4) consists in laying the second or intermediate sheet 16 of the tire casing on the first sheet 10 so that the marginal portions 18, 18' of this second or intermediate sheet 16 project well beyond the inturned longitudinal edges of the first sheet, as clearly shown in FIG. 4. Then (FIG. 5) the casing tread 20 is disposed on top of the assembly comprising the pair of superposed sheets 10 and 16.

Figure 5:
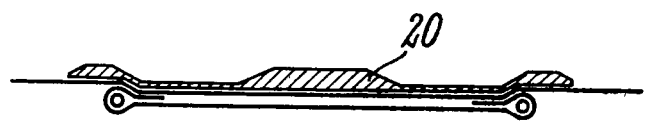

The subsequent step consists in shaping the flat structure shown in FIG. 5. FIG. 6 illustrates in cross-section the casing thus shaped to a horseshoe configuration by using any suitable and known procedure. It will be seen that the marginal portions 18, 18' of the second or intermediate sheet project downwards from this shaped casing. During the next operation, illustrated in FIG. 7, an uncured inner tube 22 is introduced into the casing shown in FIG. 6 and finally the casing (FIG. 8) is closed by causing one of the marginal portions 18, 18' of the intermediate sheet 16 to overlap the other, these two marginal portions 18, 18' being at the same time cemented or heat welded to each other. If desired, a highly impervious mixture may be introduced into the tire for constituting a sealing weld along the joint thus formed, and a protection tape may be cemented to the outer face of this joint.

The uncured product thus obtained is eventually vulcanized and the finished product consists of a tubular tire with steel bead wires embedded therein for binding the tire on conventional drop-center rims of bicycle and motorcycle wheels.

In the above-mentioned prior Patent Application a modified embodiment is described in which the uncured inner tube introduced into the casing is replaced by a layer of highly impervious mixture having a natural or synthetic rubber base, of a mixture of natural or synthetic rubbers, for example in the form of a latex solution. This modified embodiment is applicable of course to the method of the present invention.

For this purpose the intermediate sheet 16 (FIG. 4) covering the first sheet 10 is coated with a layer of such highly impervious mixture. Then, as already described hereinabove, the tread is superposed to the assembly (FIG. 5) and the complete structure is given a horseshoe configuration (FIG. 6). Finally, the shaped structure is closed in order to obtain the tubeless tire of FIG. 9 which is then vulcanized in the conventional manner.

One of the advantageous features characterizing the method of the present invention is that the manufacturing process is greatly simplified. In addition, the tire obtained with the method of this invention can be repaired without disassembling its component elements, for example as disclosed in U.S. Patent Application No 897,774.

Of course, this invention should not be construed as being strictly limited by the specific embodiments described and illustrated herein, since many modifications and changes may be made thereto without departing from the basic principles of the invention as set forth in the appended claims.

What I claim is:

1. A method of manufacturing a tubular tire for bicycles and motorcycles, said method comprising the steps of:

laying bead steel wires longitudinally on a first or inner casing sheet of a tire casing to be formed and adjacent the edges thereof;

folding the longitudinal marginal portions of said first or inner casing sheet around said bead wires in order to cover said wires completely;

laying a second or intermediate casing sheet on top of said first or inner casing sheet, the longitudinal edges of said second casing sheet projecting well beyond the in-turned longitudinal edges of said first casing sheet;

laying a casing tread on the thus superposed sheets;

shaping the tire assembly thus obtained by imparting a horseshoe configuration thereto, as seen in cross section;

introducing an uncured inner air tube into said casing;

closing the tire by assembling by welding the side edges of said second or intermediate casing sheet projecting from said casing; and vulcanizing the assembly, and thereby forming an enclosed tubular tire.

2. A method of manufacturing a tubeless tubular tire for bicycles and motorcycles, said method comprising the steps of:

laying bead steel wires longitudinally on a first or inner casing sheet of a tire casing to be formed and adjacent the edges thereof;

folding the longitudinal marginal portions of said first or inner casing sheet around said bead wires in order to cover said wires completely;

coating a second or intermediate casing sheet with a layer of material which is highly impervious to air and laying the thus coated second casing sheet on top of said first or inner casing sheet, the longitudinal edges of said second casing sheet projecting well beyond the in-turned longitudinal edges of said first casing sheet;

laying a casing tread on the thus superposed sheets;

shaping the tire assembly thus obtained by imparting a horseshoe configuration thereof, as seen in cross section;

closing the tire by assembling by welding the side edges of said second or intermediate casing sheet projecting from said casing; and vulcanizing the assembly, and thereby forming an enclosed tubeless tubular tire.

* * * * *